United States Patent [19]
Marsh

[11] 3,866,798
[45] Feb. 18, 1975

[54] LEAK DETECTION APPARATUS

[75] Inventor: Barry T. Marsh, Bridgeport, Conn.

[73] Assignee: Dresser Industries, Inc., Dallas, Tex.

[22] Filed: Aug. 17, 1973

[21] Appl. No.: 389,410

Related U.S. Application Data

[62] Division of Ser. No. 213,029, Dec. 28, 1971, Pat. No. 3,788,127.

[52] U.S. Cl. .................................................. 222/52
[51] Int. Cl. ............................................. B67d 5/34
[58] Field of Search .................. 222/52; 73/40, 40.5

[56] References Cited
UNITED STATES PATENTS

| | | | |
|---|---|---|---|
| 2,952,389 | 9/1960 | Fowler et al. | 222/52 |
| 3,183,723 | 5/1965 | Deters | 222/52 X |
| 3,273,753 | 9/1966 | Johnson et al. | 222/52 |
| 3,439,837 | 4/1969 | Hearn et al. | 222/52 |
| 3,454,195 | 7/1969 | Deters | 222/52 |

*Primary Examiner*—Robert B. Reeves
*Assistant Examiner*—Charles A. Marmor
*Attorney, Agent, or Firm*—Roy L. Van Winkle; John N. Hazelwood

[57] ABSTRACT

The improved fuel dispensing system described herein includes an improved leak detecting device located in a conduit between a remote fuel pump and a fuel dispenser. A valve is mounted in the dispenser to trap a portion of the fuel between the leak detection device and the valve. If a leak exists in the system, and that leak is above a predetermined rate, a piston in the leak detection apparatus shifts under a pressure differential to block a valve in the leak detection apparatus so that it cannot open and permit full flow. The operator of the dispenser will, upon the next operation of the dispenser, realize that a leak is present in the system due to the restricted flow. The leak detection apparatus is arranged so that the pressure of the trapped fluid is measured for a predetermined period of time. If a leak does not occur during this time, the system operates at full flow during subsequent operation. If a leak is detected during the measuring period, then the flow rate is severly reduced as previously mentioned.

2 Claims, 7 Drawing Figures

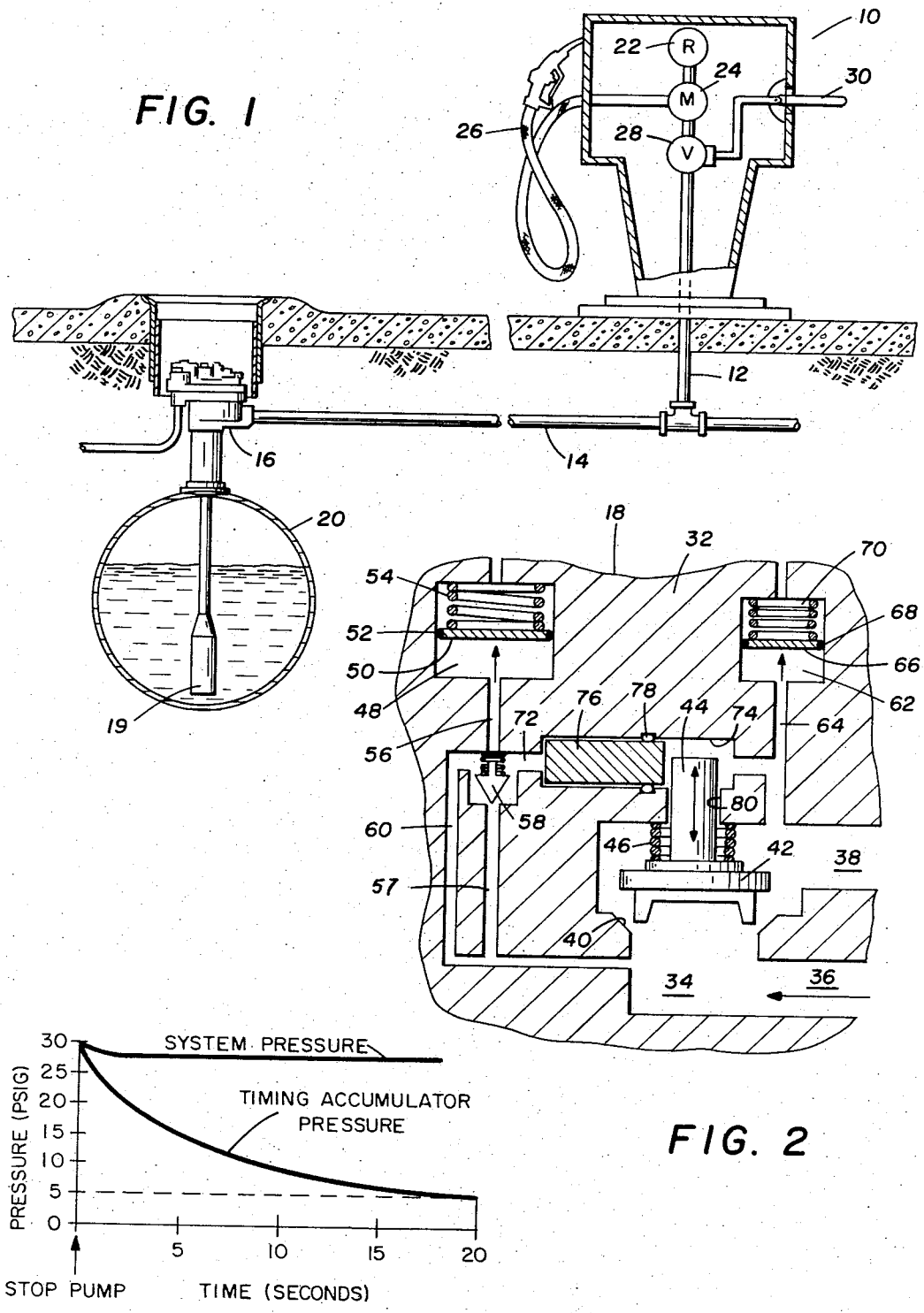

3,866,798

LEAK DETECTION APPARATUS

This is a division of application Ser. No. 213,029 filed Dec. 28, 1971, now U.S. Pat. No. 3,788,127 issued Jan. 29, 1974.

BACKGROUND OF THE INVENTION

This invention relates to improved leak detection systems. More particularly, but not by way of limitation, this invention relates to an improved leak detection device for incorporation in a fuel dispensing system.

Similar leak detection systems have been constructed in the past. U.S. Pat. No. 2,952,387, issued Sept. 13, 1960, to K. Fowler, et al., discloses one such previously constructed system. While systems of the type described therein have functioned generally satisfactorily, they include a leak detection device that can be actuated by the operator after a leak has been detected to reestablish full fuel flow through the dispensing system. It has been found that operators are hesitant to make the sometimes extensive and expensive repairs needed if they can continue with the full dispensing operation.

It is therefore one object of this invention to provide a leak detection apparatus and system in which full flow cannot be re-established after a leak has been detected without correcting the leak.

Another object of this invention is to provide an improved leak detection system and apparatus that is simpler in construction and incorporates less parts in the overall system than did the earlier known leak detection apparatus and systems.

A further object of this invention is to provide an improved leak detection apparatus that is relatively simple in construction and operation and that requires little or no maintenance during its service life.

Still another object of the invention is to provide an improved leak detection apparatus that automatically checks for a leak immediately after cessation of the dispensing operation and over a very short period of time to avoid false leak indications due to changes in volume in the trapped fluid resulting from temperature variations.

SUMMARY OF THE INVENTION

This invention provides improved leak detection apparatus and systems that comprise; a body having a flow passageway therethrough, an annular seat encircling the passageway, a first and second chamber in fluid communication with the flow passageway upstream and downstream of the valve seat, respectively, and a passageway extending between the chambers. A valve member is positioned in the body for movement toward and away from the valve seat and is provided with a resilient member urging the valve member toward the valve seat. A piston is disposed in the passageway interconnecting the chambers and is so constructed to be subject to the differential pressure existing between the chambers for movement between a position wherein the valve member can move its full extent away from the valve seat and thus provide full flow and a position wherein the piston is engageable with the valve member to prevent the full movement of the valve member away from the seat and thus provide a restricted flow through the valve upon detection of a leak in the system.

The foregoing and additional objects and advantages of the invention will become more apparent as the following detailed description is read in conjunction with the accompanying drawings wherein like reference characters denote like parts in all views.

BRIEF DESCRIPTION OF THE DRAWING

FIG. 1 is a schematic diagram illustrating the structure of an improved leak detection system constructed in accordance with the invention.

FIG. 2 is an enlarged schematic illustrating a portion of the improved leak detection apparatus incorporated in the system.

FIG. 3 is a graph illustrating the relative pressures within the dispensing system when there is no leak.

BRIEF DESCRIPTION OF THE PREFERRED EMBODIMENT

Figure 4:
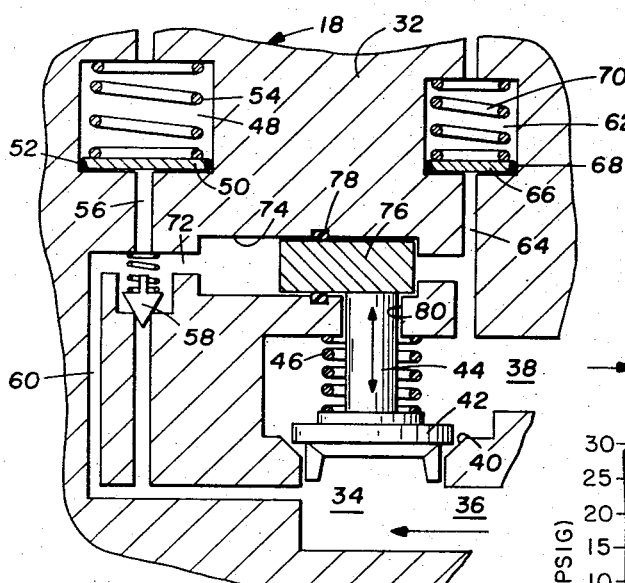
FIG. 4 is a view similar to FIG. 2, but illustrating the leak detection apparatus when a leak has been detected in the system.

Referring to the drawing and to FIG. 1 in particular, shown therein is a dispensing system incorporating the leak detection system constructed in accordance with the invention. The dispensing system includes a dispenser 10 connected by means of fuel conduit 12 with a fuel conduit 14 that extends to a pump head 16 which includes a leak detection device 18 (See FIG. 2). The pump head 16 is connected in fluid communication with a submersible pump 19 that is disposed in a fuel reservoir 20.

The dispenser 10 includes a register or computing apparatus 22 that generally indicates the total number of gallons of fuel dispensed as well as the price of the fuel dispensed. The register 22 is driven by a meter 24 through which fuel flows to a dispensing hose and nozzle assembly 26. A valve 28 is located in the conduit 12 between the conduit 14 and the meter 24 in a position to cut off flow to the meter and the dispensing nozzle assembly 26.

A switch lever 30 positioned on the dispenser 10 is arranged to open and close the valve 28 as well as to actuate the submersible pump 19 when it is desired to dispense fuel. As shown, the dispenser 10 is in schematic form and it will be understood that there are many commonly used arrangements for the apparatus described as being a portion of the dispenser 10.

As shown in FIG. 2, the leak detection device 18 includes a body 32, which may be constructed as a portion of the pump head 16, or may be a separate member for attachment thereto or insertion therein. The body 32 has a main flow passageway 34 extending therethrough that is connected at its inlet end 36 with the outlet of the submersible pump 19 and at its outlet end 38 with the conduit 14.

An annular valve seat 40 encircles the passageway 34 and is arranged to be sealingly engaged by a valve member 42 that is moveably located in the body 32. The valve member 42 includes an upwardly extending stem 44 for purposes that will be described hereinafter. Encircling the stem 44 is a compression spring 46 that has one end in engagement with body 32 and the other end in engagement with the valve member 42 and to provide a force on the valve member 42 biasing it toward engagement with the valve seat 40.

The body 32 also includes a timing chamber 48 having a moveable partition 50 located therein. The partition 50 has an annular seal 52 on its periphery that forms a fluid-tight seal with the body 32. A compression spring 54 located in the chamber 48 has one end in engagement with the upper side of the partition 50 and the other end in engagement with the body 32 to bias the moveable partition 50 toward the lower end of the chamber 48 and, thus, force any fuel that may be in the chamber 48 outwardly through a passageway 56 in the lower end thereof.

The passageway 56 extends into communication with the passageway 34 upstream of the valve seat 40. A check valve 58 is positioned in the passageway 72 to permit fluid flow through the passageway 57 from the passageway 34 into the chamber 48 but to prevent flow therethrough in the opposite direction. A passageway 60 parallel with passageway 57 connects with the passageway 72 at one end and passageway 34 at the other. Preferably, the passageway 60 is sized or includes an orifice so that fuel being discharged from the chamber 48 will require a predetermined time to empty the chamber 48.

The body 32 includes a second or leak-rate chamber 62 that is connected by a passageway 64 with the passageway 34 near its outlet 38 on the downstream side of the valve seat 40. Located in the chamber 62 is a moveable partition 66 that has an annular seal 68 on its periphery that slidingly and sealingly engages the body 32. A compression spring 70 in the chamber 62 exerts a biasing force on the moveable partition 66 urging it toward the lower end of the chamber 62 and forcing fuel that may be contained therein outwardly through the passageway 64. The passageway 64 is either sized or includes an orifice that is properly sized to permit discharge of the fuel from the chamber 62 at a predetermined rate which will be sufficient to restore fuel lost from the dispensing system at a rate below the desired detection leakage rate.

A passageway 72 extends between the passageway 56 and the passageway 64. The passageway 72 includes an enlarged portion 74 in which a piston 76 is moveably positioned.

The piston 76 is shorter than the length of the enlarged portion 74 of the passageway 72 to permit a reciprocation of the piston 76. An annular seal 78 encircles the enlarged portion 74 and is disposed in sealing engagement with the exterior of the piston 76. The arrangement of the piston 76 is such that movement thereof is caused by a differential in pressure between the passageway 56 and the passageway 64.

A lateral opening 80 extends from the enlarged portion 74 of the passageway 72 into the main flow passageway 34. The lateral opening 80 is of sufficient size to receive the stem 44 of the valve member 42. It should also be pointed out that the lateral opening 80 is located relatively near the end of the enlarged portion 74 adjacent to the passageway 64 so that when the piston 76 is moved to the left as seen in FIG. 2, the stem 44 can move upwardly into the enlarged passageway 74 without engaging the piston 76.

OPERATION OF THE PREFERRED EMBODIMENT

With the leak detection apparatus installed in the dispensing system as previously described, and with no leaks existing in the system, it will be understood that actuation of the switch lever 30 opens the valve 28 and actuates the submersible pump 19. Fuel from the reservoir 20 is forced through the passageway 34 by the pump 19 lifting the valve member 42 off the seat 40, through the conduits 14 and 12 past the valve 28 and meter 24 and outwardly through the hose and nozzle assembly 26 for ultimate delivery to the consumer.

When the dispensing operation has been completed, switch lever 30 is returned to the off position closing the valve 28 and cutting off the submersible pump 19. The valve member 42, under the urging of the spring 46, returns into sealing engagement with the seat 40 thereby trapping fuel in the conduits 14 and 12 between the valve 28 and the valve member 42.

During the dispensing operation, fuel flowing through the passageway 34 entered the passageways 57 and 60 flowing upwardly into the timing chamber 48 displacing the partition 50 upwardly against the spring 54. Simultaneously, fuel in the passageway 34 passed upwardly through the passageway 64 filling the leak rate chamber or accumulator 62 and displacing the moveable partition 66 therein upwardly against the spring 70.

As previously mentioned, there was no leak in the system at this time, and therefore, the piston 76 has an equal pressure exerted on each end. Since there is no pressure differential existing across the piston 76, the piston 76 remains in the position illustrated in FIG. 2 and normal full flow dispensing operations can take place when desired.

When the dispensing operation was completed, the check valve 58 in the passageway 56 closed, forcing fuel in the chamber 48 to flow through the parallel bypass passageway 60 to the passageway 34 on the upstream side of the valve seat 40. Since the passageway 60 meters the discharge rate from the chamber 48, the emptying of the chamber 48 occurs over a period of time, preferably about 20 seconds, as illustrated in the graph FIG. 3.

In that figure, it can be seen that the timing accumulator pressure, that is the pressure in the chamber 48, decreases from about 30 psig to about 5 psig during the 20 second interval. It can also be seen in FIG. 3 that the system pressure, that is the pressure trapped in the conduits 14 and 12, remains at a relatively stable value that is substantially above the timing accumulator pressure. Thus, it can be appreciated that a differential in pressure exists across the piston 76 from the right to the left as seen in FIG. 2 and acts to retain the piston 76 in the position shown therein.

Assuming that a leak occurs during a dispensing operation, there will be no indication of the leak while the submersible pump 19 is in operation. Upon completion of the dispensing operating closure of the valve 28 and the shut down of the pump 19, fuel is trapped in the conduits 14 and 12 as previously described. Since a leak has occurred, the pressure in the conduits 12 and 14 begins to decrease. If the rate of leakage is greater than can be replenished by the discharge of the chamber 62 through the passageway 64, the pressure in the chamber 48 and in the passageway 56 will be greater than the pressure in the passageway 64. The result of the differential in pressure is to exert a force on the piston 76 moving the piston 76 to the right as seen in FIG. 4. Such movement positions the piston 76 immediately above the stem 44 of the valve member 42 preventing complete movement of the valve 42 away from the valve seat 40. Under the circumstances, the next attempt to dispense fuel will be subject to a very restricted flow since the valve member 42 is retained by the piston 76 so close to the valve seat 44 that full flow of fuel cannot occur. When the operator observes the restricted flow, he will know that the leak indicating device 18 has detected a leak in the system.

Figure 5:
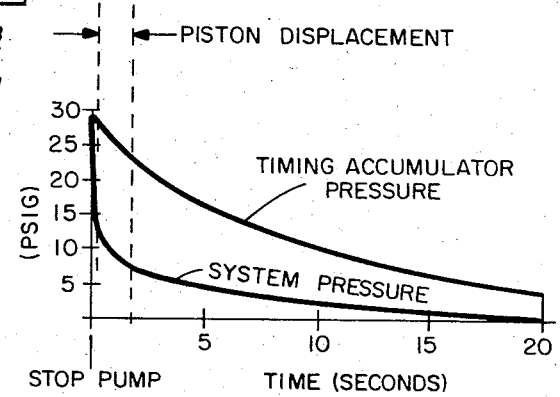
FIG. 5 is a graph illustrating the pressure relationships in the system upon detection of a leak.

The graph of FIG. 5 illustrates the relative pressures in the system when a leak is present. As seen therein, the system pressure has dropped very rapidly so that it is below the gradually decreasing pressure in the timing accumulator, that is, in the chamber 48 so that the resulting differential pressure across the piston 76 is from left to right as seen in FIG. 4.

Subsequent operation of the dispenser with the limited flow rate, will not alter the location of the piston 76 since the chamber 48 and the chamber 62 fill at the same pressure during such dispensing operations so that the pressure is equal on each end of the piston 76. With the absence of a differential in pressure across the piston 76, it remains in the right hand position blocking the valve member 42 as illustrated in FIG. 4.

The leak detection device 18 of this invention cannot be reset as long as the leak is present in the system. The device 18 is arranged to automatically reset after the leak has been repaired. After the leak has been repaired and after a dispensing operation has taken place at the restricted flow rate, the dispenser is shut down trapping fuel in the conduits 12 and 14. The chambers 48 and 62 are filled during the dispensing operation as previously described.

Figure 6:
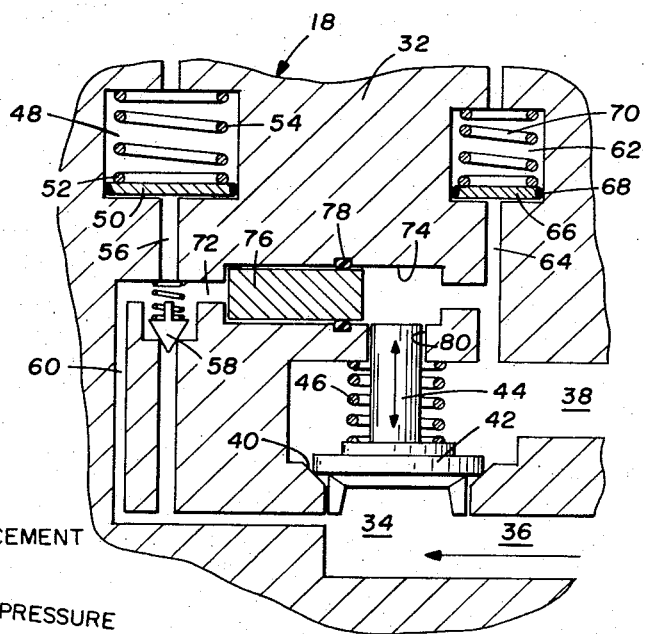
FIG. 6 is still another view similar to FIGS. 2 and 4, but illustrating the position of the various components of the leak detection apparatus after the leak has been repaired and automatic reset has occurred.
Figure 7:
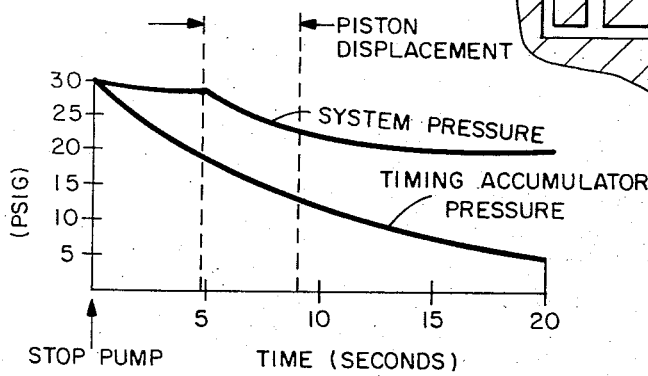
FIG. 7 is another graph illustrating the relationship of the pressures in the system during the automatic reset of the leak detection apparatus.

Since the leak has been repaired, the fuel in the conduits 12 and 14 has a pressure of approximately 30 psi which is exerted through the passageway 64 upon the moveable partition 66 located in the chamber 62. The valve member 42 is in the closed position as illustrated in FIG. 6. As fuel is discharged from the chamber 48 with the downward movement of the partition 50, the fuel flows through the passageway 60 into the passageway 34 upstream of the valve seat 40. As the fuel flows therethrough, the pressure on the piston 76, that is the pressure on the left hand end thereof as seen in FIG. 6, will decrease as illustrated in the graph of FIG. 7. Since system pressure is maintained on the right hand side of the piston 76, the piston 76 is displaced to the left to a position where it can not be engaged by the valve stem 44 during subsequent dispensing operations.

The displacement of the piston 76 does increase the volume of the system and a slight pressure decrease occurs as illustrated in FIG. 7. However, the moveable partition 66, under the urging of the spring 70, discharges fuel from the chamber 62 through the passageway 64 to maintain sufficient pressure in the system upstream of the seat 42 to complete displacement of the piston 76. As can be seen clearly in FIG. 7, the system pressure remains above the timing accumulator pressure, that is the pressure that is exerted on the left hand end of the piston 76, so that a differential in pressure is maintained thereacross sufficient to displace the piston 76 to the non-engaging position illustrated in FIG. 6.

From the foregoing detailed description, it can be seen that the leak detection system and apparatus of this invention is relatively simple in construction with few moving parts so that the maintenance and service is reduced to the minimum.

Furthermore, it can be seen that the leak detection apparatus described will clearly indicate the presence of a leak and, yet, cannot be readily reset unless the leak is repaired. Thus, an operator of the dispensing system is by necessity required to repair any leaks before he can dispense fuel at the full flow rate.

It can also be seen that the device 18 has a built-in timing circuit which senses the system for leaks over a relatively short period so that there will not be sufficient time for temperature variations to cause false indication of leaks.

It will be understood that the foregoing detailed description is presented by way of example only and that many changes and modifications can be made without departing from the spirit and scope of the invention.

The embodiments of an invention in which an exclusive property or privilege is claimed are defined as follows:

1. An improved fuel dispensing system comprising:
   a fuel reservoir;
   pump means disposed in communication with said reservoir for pumping fuel out of said reservoir;
   a fuel dispenser located remote from said reservoir and including fuel delivery means and a valve for controlling the flow of fuel to said fuel delivery means;
   conduit means connecting said pump means and delivery means in fluid communication; and
   leak detection means operably connected in said conduit means remote from said fuel dispenser, said leak detection means having a fuel flow passageway extending therethrough, an annular valve seat encircling said passageway, a valve member moveable toward and away from said valve seat, means biasing said valve member toward said seat for closing said passageway, timing accumulator means in communication with said passageway between said valve member and pump means, said timing accumulator means including a chamber, pressure responsive means in said chamber, and means for controlling the rate of flow from said chamber whereby said chamber will empty in a predetermined time after said valve is closed, leak-rate accumulator means in communication with said passageway between said valve member and said valve, said leak-rate accumulator means including a chamber, pressure responsive means in said chamber, and means for controlling the rate of flow from said chamber to the conduit between said valve member and valve, passage means connecting said timing and leak-rate accumulator means, and a piston sealingly disposed in said passage means and moveable therein between a first position when pressure in said leak-rate accumulator means is greater and a second position for engaging said valve member to limit movement of said valve member away from said valve seat, when pressure in said timing accumulator means is greater thereby indicating a leak by reducing the fuel flow rate when fuel is subsequently dispensed from said fuel dispenser.

2. The fuel dispensing system of claim 1 wherein each said pressure responsive means includes:
 a partition member slidingly and sealingly disposed in said chamber; and,
 a compression spring for biasing said partition member in a direction to discharge fuel from said chamber.

* * * * *